United States Patent
Hong et al.

(12)

(10) Patent No.: US 11,053,124 B2
(45) Date of Patent: Jul. 6, 2021

(54) CONDUCTIVE GREASE WITH ENHANCED THERMAL OR ELECTRICAL CONDUCTIVITY AND REDUCED AMOUNT OF CARBON PARTICLE LOADING

(71) Applicant: South Dakota Board of Regents, Pierre, SD (US)

(72) Inventors: Haiping Hong, Rapid City, SD (US); Christian A. Widener, Rapid City, SD (US); Gregory Lee Christensen, Rapid City, SD (US)

(73) Assignee: South Dakota Board of Regents, Pierre, SD (US)

( * ) Notice: Subject to any disclaimer, the term of this patent is extended or adjusted under 35 U.S.C. 154(b) by 0 days.

(21) Appl. No.: 16/381,798

(22) Filed: Apr. 11, 2019

(65) Prior Publication Data

US 2019/0315625 A1    Oct. 17, 2019

Related U.S. Application Data

(60) Provisional application No. 62/656,725, filed on Apr. 12, 2018.

(51) Int. Cl.

| | | |
|---|---|---|
| *C01B 32/174* | (2017.01) | |
| *C09K 5/10* | (2006.01) | |
| *H01B 1/24* | (2006.01) | |
| *B82Y 30/00* | (2011.01) | |
| *H01B 1/04* | (2006.01) | |

(52) U.S. Cl.
CPC ............ *C01B 32/174* (2017.08); *B82Y 30/00* (2013.01); *C09K 5/10* (2013.01); *H01B 1/04* (2013.01); *H01B 1/24* (2013.01); *C01B 2202/02* (2013.01); *C01B 2202/06* (2013.01); *C01B 2202/22* (2013.01); *C01B 2202/24* (2013.01)

(58) Field of Classification Search
CPC ... H01B 1/02; H01B 1/04; H01B 1/24; C09K 5/10; B82Y 30/00
USPC ......... 252/500, 502, 510; 977/742, 786, 932
See application file for complete search history.

(56) References Cited

U.S. PATENT DOCUMENTS

| | | |
|---|---|---|
| 5,498,372 A | 3/1996 | Hedges |
| 6,132,645 A | 10/2000 | Hedges |
| 7,871,533 B1 | 1/2011 | Haiping et al. |
| 8,222,190 B2 | 7/2012 | Zhamu et al. |
| 2009/0088353 A1* | 4/2009 | Berry .................. C10M 169/02 508/388 |
| 2011/0003721 A1* | 1/2011 | Hong ..................... C09K 5/10 508/113 |
| 2011/0014356 A1 | 1/2011 | Fornes et al. |
| 2011/0046027 A1* | 2/2011 | Zhamu ................ C10M 103/02 508/113 |
| 2011/0224113 A1* | 9/2011 | Pick ................... C10M 113/02 508/116 |
| 2014/0085813 A1* | 3/2014 | Sedarous ................ C09K 5/14 361/679.54 |
| 2016/0115413 A1 | 4/2016 | Hasegawa et al. |
| 2016/0369197 A1 | 12/2016 | Erdemir et al. |
| 2018/0199461 A1* | 7/2018 | Huss ................... H05K 7/2039 |

FOREIGN PATENT DOCUMENTS

JP          2013001849 A   *   1/2013

OTHER PUBLICATIONS

Jaiswal "Synthesis, Characterization, and Tribological Evaluation of TiO2-Reinforced Boron and Nitrogen co-Doped Reduced Graphene Oxide Based Hybrid Nanomaterials as Efficient Antiwear Lubricant Additives." ACS Appl. Mater. Interfaces 2016, 8, 11698-11710 (Year: 2016).*

* cited by examiner

*Primary Examiner* — Tri V Nguyen
(74) *Attorney, Agent, or Firm* — McKee, Voorhees & Sease, PLC

(57) ABSTRACT

Disclosed herein is a conductive grease composition that includes a functionalized carbon nanomaterial and/or boron nanomaterial and a base oil. The nanomaterial and base oil forms hydrogen bond network in the disclosed composition. Because of the formed hydrogen bonds, the disclosed grease exhibits enhanced thermal or electrical conductivity. Also disclosed is a method to improve thermal or electrical conductivity of an existing grease composition.

16 Claims, 5 Drawing Sheets

CONDUCTIVE GREASE WITH ENHANCED THERMAL OR ELECTRICAL CONDUCTIVITY AND REDUCED AMOUNT OF CARBON PARTICLE LOADING

CROSS-REFERENCE TO RELATED APPLICATION

This application claims priority under 35 U.S.C. § 119 to U.S. Ser. No. 62/656,725, filed Apr. 12, 2018, which is incorporated herein by reference in its entirety.

This application is related to U.S. patent application Ser. No. 62/656,773, entitled "FLEXIBLE NANO COATING WITH SIGNIFICANTLY ENHANCE ELECTRICAL, THERMAL AND SEMICONDUCTOR PROPERTIES," and U.S. patent application Ser. No. 16/381,861 entitled "FLEXIBLE NANO COATING WITH SIGNIFICANTLY ENHANCE ELECTRICAL, THERMAL AND SEMICONDUCTOR PROPERTIES"; the entire contents of these patent applications are hereby expressly incorporated herein by reference including, without limitation, the specification, claims, and abstract, as well as any figures, tables, or drawings thereof.

FIELD OF THE INVENTION

The invention relates to conductive grease compositions and methods of preparing and using the same. In particular, conductive greases comprising carbon particles.

BACKGROUND OF THE INVENTION

Conductive greases have been prepared using carbon nanotubes for a variety of applications. They have been found to be particularly good thermal transfer fluids. Such compositions have required relatively high concentrations of carbon nanotubes, e.g., greater than 15 wt. % or even greater than 20 wt. %. As disclosed in U.S. Pat. No. 7,871,533, a stable and homogeneous grease based on carbon nanotubes (CNTs, single-wall and multi-wall) in polyalphaolefin oil has been produced without using a chemical surfactant. For example, with a 22-24 wt % (14-15 vol %) multi-wall CNT loading, a grease has a thermal conductivity (TC) 70-80% increase compared to one with no nanotube loading. In addition, such a grease has a high dropping point, good temperature resistance, and does not react with copper at temperatures up to 177° C.

However, such a grease with a high carbon nanotube loading has a low electrical conductivity and has proven to be difficult for use in electrical applications. Thus, there is a need to prepare grease compositions that have both stability and improved electrical conductivity.

Accordingly, it is an objective of the present disclosure to develop a stable nanogrease composition with an improved thermal and/or electrical conductivity.

A further object of the invention is to provide a grease composition with low carbon nanotube loading (<2 wt %) and improved thermal and/or electrical properties.

Other objects, advantages and features of the present invention will become apparent from the following specification taken in conjunction with the accompanying figures.

BRIEF SUMMARY OF THE INVENTION

An advantage of the invention is enhanced thermal and/or electrical conductivity of the disclosed grease compositions. It is an advantage of the present invention that the conductive greases have unexpectedly improved electrical conductivity. This is particularly surprising given the low weight percentage loading of carbon particles.

In one aspect, disclosed herein is a stable conductive grease composition comprising a base oil and nanomaterial, wherein the nanomaterial is a functionalized nanomaterial having one or more of a first functional group capable of forming a hydrogen bond or boron nanomaterial; and wherein the base oil comprises one or more of a second functional group capable of forming a hydrogen bond with the first function group of the nanomaterial.

In another aspect, the present disclosure is a method of enhancing thermal or electric conductivity of a grease composition, the method comprises adding into a grease composition a nanomaterial to form an improved grease composition, wherein the nanomaterial is a functionalized carbon nanomaterial having one or more of a first functional group capable of forming a hydrogen bond with a second functional group in the grease composition or boron nanomaterial.

While multiple embodiments are disclosed, still other embodiments of the present invention will become apparent to those skilled in the art from the following detailed description, which shows and describes illustrative embodiments of the invention. Accordingly, the figures and detailed description are to be regarded as illustrative in nature and not restrictive.

Figure 1:
FIG. 1 shows the grease based on 7.5 wt % MWNT-OH/92.5 wt % Ester oil.

Various embodiments of the present invention will be described in detail with reference to the figures. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENT

The present invention relates to conductive greases comprising carbon particles. The conductive greases have many advantages over existing nanogreases. For example, the conductive greases have significantly improved electrical conductivity over nanogreases used in many electrical transfer fluid applications. Furthermore, these improvements occur with a reduction in the amount of carbon added to the conductive grease when compared to existing conductive greases comprising carbon nanotubes. This improvement is unexpected given the reduction in carbon loading as carbon nanotubes are conductive. Additionally, it was previously seen that thermal conduction properties for thermal nanofluids comprising carbon nanotubes were increased with increasing concentrations of carbon nanotubes.

Definitions

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below. Moreover, the embodiments of this invention are not limited to particular electrical conductive grease applications, which can vary and are understood by skilled artisans. It is further to be understood that all terminology used herein is for the purpose of describing particular embodiments only and is not intended to be limiting in any manner or scope.

As used in this specification and the appended claims, the singular forms "a," "an" and "the" can include plural referents unless the content clearly indicates otherwise. Further, all units, prefixes, and symbols may be denoted in its SI accepted form.

Numeric ranges recited within the specification are inclusive of the numbers defining the range and include each integer within the defined range. Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges, fractions, and individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6, and decimals and fractions, for example, 1.2, 3.8, 1½, and 4¾ This applies regardless of the breadth of the range.

The term "about," as used herein, refers to variation in the numerical quantity that can occur, for example, through typical measuring techniques and equipment, with respect to any quantifiable variable, including, but not limited to, mass, volume, time, distance, wave length, frequency, voltage, current, and electromagnetic field. Further, given solid and liquid handling procedures used in the real world, there is certain inadvertent error and variation that is likely through differences in the manufacture, source, or purity of the ingredients used to make the compositions or carry out the methods and the like. The term "about" also encompasses these variations. Whether or not modified by the term "about," the claims include equivalents to the quantities.

The methods and compositions of the present invention may comprise, consist essentially of, or consist of the components and ingredients of the present invention as well as other ingredients described herein. As used herein, "consisting essentially of" means that the methods, systems, apparatuses and compositions may include additional steps, components or ingredients, but only if the additional steps, components or ingredients do not materially alter the basic and novel characteristics of the claimed methods, systems, apparatuses, and compositions.

As used herein, the term "alkyl" or "alkyl groups" refers to saturated hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups (or "cycloalkyl" or "alicyclic" or "carbocyclic" groups) (e.g., cyclopropyl, cyclopentyl, cyclohexyl, cycloheptyl, cyclooctyl, etc.), branched-chain alkyl groups (e.g., isopropyl, tert-butyl, sec-butyl, isobutyl, etc.), and alkyl-substituted alkyl groups (e.g., alkyl-substituted cycloalkyl groups and cycloalkyl-substituted alkyl groups).

Unless otherwise specified, the term "alkyl" includes both "unsubstituted alkyls" and "substituted alkyls." As used herein, the term "substituted alkyls" refers to alkyl groups having substituents replacing one or more hydrogens on one or more carbons of the hydrocarbon backbone. Such substituents may include, for example, alkenyl, alkynyl, halogeno, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, acylamino, diarylamino, and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl, or aromatic (including heteroaromatic) groups.

In some embodiments, substituted alkyls can include a heterocyclic group. As used herein, the term "heterocyclic group" includes closed ring structures analogous to carbocyclic groups in which one or more of the carbon atoms in the ring is an element other than carbon, for example, nitrogen, sulfur or oxygen. Heterocyclic groups may be saturated or unsaturated. Exemplary heterocyclic groups include, but are not limited to, aziridine, ethylene oxide (epoxides, oxiranes), thiirane (episulfides), dioxirane, azetidine, oxetane, thietane, dioxetane, dithietane, dithiete, azolidine, pyrrolidine, pyrroline, oxolane, dihydrofuran, and furan.

The term "polyol ester" refers to an ester of an organic compound containing at least two hydroxyls with at least one carboxylic acid.

The term "surfactant" refers to a molecule having surface activity, including wetting agents, dispersants, emulsifiers, detergents, and foaming agents, and the like. It is understood to be inclusive of the use of a single surfactant or multiple surfactants.

The term "weight percent," "wt. %," "wt-%," "percent by weight," "% by weight," and variations thereof, as used herein, refer to the concentration of a substance as the weight of that substance divided by the total weight of the composition and multiplied by 100.

As used herein, the term "free of a compound" refers to a composition, mixture, or ingredient that does not contain the compound or to which the compound has not been added. Should the compound be present through contamination of a composition, mixture, or ingredients free of the compound, the amount of the compound shall be less than 0.5 wt %. More preferably, the amount of the compound is less than 0.1 wt-%, and most preferably, the amount of phosphate is less than 0.01 wt %. In this disclosure, the compound that the disclosed grease composition is free of can be a surfactant, additive, or combination thereof.

As used herein, the term "an existing grease composition" refers to a grease composition that does not contain any functionalized carbon nanomaterial or boron nanomaterial. Such an existing grease composition can contain non-functionalized carbon nanomaterial.

The methods, systems, apparatuses, and compositions of the present invention may comprise, consist essentially of, or consist of the components and ingredients of the present invention as well as other ingredients described herein. As used herein, "consisting essentially of" means that the methods, systems, apparatuses and compositions may include additional steps, components or ingredients, but only if the additional steps, components or ingredients do not materially alter the basic and novel characteristics of the claimed methods, systems, apparatuses, and compositions.

Further terms are defined in the detailed description.

Conductive Grease Compositions

The conductive grease compositions comprise a fluid capable of hydrogen bonding and a nanomaterial. Preferred fluids capable of hydrogen bonding, include, a base oil capable of hydrogen bonding. Preferred nanomaterials are those functionalized having one or more of a first functional group capable of forming an electrostatic attraction, including, but not limited to, a hydrogen bond or boron nanomaterial; and wherein the fluid comprises one or more of a second functional group capable of forming an electrostatic attraction, including, but not limited to, a hydrogen bond with the first function group of the nanomaterial. Preferably, the conductive grease composition is stable. Preferably, the conductive grease is a nanogrease. Non-limiting, exemplary conductive grease compositions are shown the following table.

|  | First Exemplary Composition (wt. %) | Second Exemplary Composition (wt. %) | Third Exemplary Composition (wt. %) |
| --- | --- | --- | --- |
| Fluid Component | 25-99.9 | 50-99.5 | 75-95 |
| Nanomaterial | 0.1-20 | 0.5-10 | 0.5-5 |
| Optional Additional Components | 0-70 | 0-47 | 0-23 |

The conductive grease compositions preferably have improved electrical conductivity and improved resistance. Preferably, the resistance is improved (lowered) over the base oil alone by at least about 10%, 20%, 30%, 40%, 50%, 60%, 70%, 80% when measured by the same test under the same conditions. Preferably, the electrical conductivity is improved (increased) over the base oil alone by at least about 10%, 20%, 50%, 100%, 200%, 250%, 300%, 400%, 500%, when measured by the same test under the same conditions.

The conductive grease compositions preferably have improved thermal conductivity. Preferably, the thermal conductivity is improved (increased) over the base oil alone by at least about 10%, 20%, 30%, 40%, 50%, 60%, 70% 80%, 90% 100%, 150%, 200%, 250%, 300%, 350%, when measured by the same test under the same conditions.

The conductive grease compositions can optionally comprise one or more additional components added to provide particular properties to the grease. For example, such components can include grease additives, surfactants, viscosity modifiers, conductive particles, or combinations or mixtures thereof. Other additional components can also be added.

Fluid Component

In some embodiments, the base oil comprises an alkyl alcohol, alkylene glycols, polyol ester, or a combination thereof. In some other embodiments, the base oil comprises ethylene glycol or diethylene glycol, a combination thereof. In yet some other embodiments, wherein the base oil comprises a silicone transfer compound. In some other embodiments, the base oil comprises glycerol.

In some embodiments, the grease composition further comprises water. In some embodiments, the base oil is an existing grease composition. In some other embodiments, the base oil is an existing commercial available common grease composition. In some embodiments, the base oil comprises Valvoline Cerulean Grease, NYE grease, Krytox XHT 750, PAO Durasyn 166, Petro-Canada NH650HT, or Royco 500.

In some embodiments, the composition comprises from about 25 wt-% to about 99 wt-% of the base oil. In some other embodiments, the composition comprises from about 25 wt-% to about 90 wt-%, from about 25 wt-% to about 85 wt-%, from about 25 wt-% to about 80 wt-%, from about 25 wt-% to about 75 wt-%, from about 25 wt-% to about 70 wt-%, from about 25 wt-% to about 65 wt-%, from about 25 wt-% to about 60 wt-%, from about 25 wt-% to about 55 wt-%, from about 25 wt-% to about 50 wt-%, from about 25 wt-% to about 45 wt-%, from about 25 wt-% to about 40 wt-%, from about 25 wt-% to about 35 wt-%, from about 25 wt-% to about 30 wt-%, from about 30 wt-% to about 99 wt-%, from about 35 wt-% to about 99 wt-%, from about 45 wt-% to about 99 wt-%, from about 55 wt-% to about 99 wt-%, from about 65 wt-% to about 99 wt-%, from about 75 wt-% to about 99 wt-%, from about 80 wt-% to about 99 wt-%, from about 85 wt-% to about 99 wt-%, from about 99 wt-% to about 99 wt-%, from about 25 wt-% to about 95 wt-%, from about 35 wt-% to about 95 wt-%, from about 45 wt-% to about 95 wt-%, from about 55 wt-% to about 95 wt-%, from about 65 wt-% to about 95 wt-%, from about 75 wt-% to about 95 wt-%, from about 85 wt-% to about 95 wt-%, from about 25 wt-% to about 85 wt-%, from about 35 wt-% to about 75 wt-%, from about 45 wt-% to about 65 wt-%, from about 55 wt-% to about 60 wt-%, about 25 wt-%, about 35 wt-%, about 40 wt-%, about 45 wt-%, about 55 wt-%, about 60 wt-%, about 65 wt-%, about 70 wt-%, about 75 wt-%, about 80 wt-%, about 85 wt-%, about 90 wt-%, about 95 wt-%, about 99 wt-%, or any value therebetween of the base oil.

In another aspect, the present disclosure is a method of enhancing thermal or electric conductivity and/or resistance of a grease composition, the method comprises adding into a grease composition a nanomaterial to form an improved grease composition, wherein the nanomaterial is a functionalized carbon nanomaterial having one or more of a first functional group capable of forming a an electrostatic attraction, including, but not limited to, a hydrogen bond with a second functional group in the grease composition or boron nanomaterial.

In some other embodiments the method further comprising adding water or a base oil, wherein the base oil comprises a functional group capable of forming an electrostatic attraction, including, but not limited to, a hydrogen bond with the first functional group of the nanomaterial.

In some embodiments, the nanomaterial comprises a carbon nanomaterial, boron nanomaterial, or combination thereof. In some embodiments, the nanomaterial comprises a single-walled carbon, multiple-walled carbon, single-walled boron, multiple-walled boron nanomaterial, or combination thereof. In some embodiments, the improved grease composition is one of the grease compositions disclosed herein.

Base Oil

A preferred fluid for use in the conductive grease compositions is a base oil. Suitable base oils are preferably capable of hydrogen bonding. A base oil may be selected from a wide variety of well-known organic oils, including petroleum distillates, synthetic petroleum oils, greases, gels, oil-soluble polymer composition, vegetable oils, and combinations thereof. Petroleum distillates, also known as mineral oils, generally include paraffins, naphthenes and aromatics. Preferably, the base oil is capable of forming hydrogen bonds or similar electrostatic attractions. The American Petroleum Institute (API) generally sorts base oils into five groups, three of which are mineral oils and two of which are synthetic: (1) solvent refined paraffinic mineral oils, (2) saturated paraffinic mineral oils, (3) synthesized hydrocarbon paraffinic mineral oils, (4) polyalphaolefin (PAO) synthetic oils, and (5) non-PAO synthetic oils.

Mineral Oils

Solvent refined paraffinic mineral oils (API Group I Oils), typically have less than 90% saturates, greater than 0.03% sulfur, and a viscosity-index range of about 80 to about 120. The temperature range for these oils is from about 32 to about 150° F.

Saturated paraffinic mineral oils (API Group II Oils), sometimes referred to as hydrotreated oils, also typically have greater than 90% saturates, less than 0.03% sulfur, and a viscosity-index range of about 80 to about 120. These oils are often clearer than the solvent refined paraffinic mineral oils.

Synthesized hydrocarbon paraffinic mineral oils (API Group III Oils), sometimes referred to as hydrocracked oils, typically have greater than 90% saturates, less than 0.03% sulfur, and a viscosity-index greater than about 120.

Synthetic Oils

PAO synthetic oils (API Group IV Oils) are synthetic oils based on polymers of an alpha olefin structure. They are suitable for use in a broad temperature range. Particular PAO synthetic oils can be preferred for use in very cold conditions or in high-heat conditions.

Non-PAO oils (API Group V Oils) are synthetic oils not based on the alpha olefin structure. The most common non-PAO synthetic oils are ester-based oils, however, other types are common too. For example, non-PAO synthetic oils include, but are not limited to, silicone oils, phosphate ester oils, hindered ester oils, polyalkylene glycol (PAG) oils, polyglycol oils, polyolester oils, water-glycol fluids, diesters (dibasic acid ester), biolubes, naphthenic oil, alkylated naphthalene (AN), polyether, phenyl ether polymer or polyphenyl ethers (PPEs), Polyvinyl ether (PVE), halogenated hydrocarbons, Fluids based on halogenated (fluorinated and/or chlorinated) hydrocarbons include chlorofluorcarbons (CFC), halogenated fluorocarbons (HFC), halogenated chlorofluorocarbon (HCFC), and perfluorocarbon (PFC) fluids, and other synthetic fluids. Silicone base oils can include, but are not limited to, fluorosilicones, alkylmethylsilicones, and other silicone-based oils.

While the compositions of the invention can use a wide variety of oils, preferred base oils include synthetic oils. Preferred base oils for use in the compositions and methods include, but are not limited to, alkylaryls such as dodecylbenzenes, tetradecylbenzenes, dinonylbenzenes, and di-(2-ethylhexyl)benzenes; polyphenyls such as biphenyls, terphenyls, and alkylated polyphenyls; fluorocarbons such as polychlorotritluoroethylenes and copolymers of perfluoroethylene and perfluoropropylene; polymerized olefins such as polybutylenes, polypropylenes, propylene-isobutylene copolymers, chlorinated polybutylenes, poly(1-octenes), and poly(1-decenes); organic phosphates such as triaryl or trialkyl phosphates, tricresyl phosphate, trioctyl phosphate, and diethyl ester of decylphosphonic acid; and silicates such as tetra(2-ethylhexyl) silicate, tetra(2-ethylbutyl) silicate, and hexa(2-ethylbutoxy) disiloxane. Other examples include polyol esters, polyglycols, polyphenyl ethers, polymeric tetrahydrofurans, and silicones.

In one embodiment of the present disclosure, the base oil is a diester which is formed through the condensation of a dicarboxylic acid, such as adipic acid, azelaic acid, fumaric acid, maleic acid, phtalic acid, sebacic acid, suberic acid, and succinic acid, with a variety of alcohols with both straight, cyclic, and branched chains, such as butyl alcohol, dodecyl alcohol, ethylene glycol diethylene glycol monoether, 2-ethylhexyl alcohol, isodecyl alcohol, hexyl alcohol, pentaerytheritol, propylene glycol, tridecyl alcohol, and trimethylolpropane. Modified dicarboxylic acids, such as alkenyl malonic acids, alkyl succinic acids, and alkenyl succinic acids, can also be used. Specific examples of these esters include dibutyl adipate, diisodecyl azelate, diisooctyl azelate, di-hexyl fumarate, dioctyl phthalate, didecyl phthalate, di(2-ethylhexyl) sebacate, dioctyl sebacate, dicicosyl sebacate, and the 2-ethylhexyl diester of linoleic acid dimer, the complex ester formed by reacting one mole of sebacic acid with two moles of tetraethylene glycol and two moles of 2-ethylhexanoic acid.

In another embodiment, the base oil is a polyalphaoletin which is formed through oligomerization of 1-olefines containing 2 to 32 carbon atoms, or mixtures of such olefins. Some common alphaolefins are 1-octene, 1-decene, and 1-dodecene. Examples of polyalphaolefins include poly-1-octene, poly-1-decene, poly-1-dodecene, mixtures thereof, and mixed olefin-derived polyolefins. Polyalphaolefins are commercially available from various sources, including DURASYN®162, 164, 166, 168, and 174 (BP-Amoco Chemicals, Naperville, Ill.), which have viscosities of 6, 18, 32, 45, and 460 centistokes, respectively.

In yet another embodiment, the base oil is a polyol ester which is formed through the condensation of a monocarboxylic acid containing 5 to 12 carbons and a polyol and a polyol ether such as neopentyl glycol, trimethylolpropane, pentaerythritol, dipentaerythritol, and tripentaerythritol. Examples of commercially available polyol esters are ROYCO® 500, ROYCO® 555, and ROYCO® 808. ROYCO® 500 contains about 95% of pentaerythritol esters of saturated straight fatty acids with 5 to 10 carbons, about 2% of tricresyl phosphate, about 2% of N-phenyl-alpha-naphthylamine, and about 1% of other minor additives. ROYCO® 808 are about 30 to 40% by weight of trimethylolpropane esters of heptanoic, caprylic and capric acids, 20 to 40% by weight of trimethylolpropane esters of valerie and heptanoic acids, about 30 to 40% by weight of neopentyl glycol esters of fatty acids, and other minor additives. Generally, polyol esters have good oxidation and hydrolytic stability. The polyol ester for use herein preferably has a pour point of about −100° C. or lower to −40° C. and a viscosity of about 2 to 100 centistoke at 100° C.

In yet another embodiment, the base is a polyglycol which is an akylene oxide polymer or copolymer. The terminal hydroxyl groups of a polyglycol can be further modified by esterification or etherification to generate another class of known synthetic oils. Interestingly, mixtures of propylene and ethylene oxides in the polymerization process will produce a water soluble lubricant oil. Liquid or oil type polyglycols have lower viscosities and molecular weights of about 400, whereas 3,000 molecular weight polyglycols are viscous polymers at room temperature.

In yet another embodiment, the base oil is a combination of two or more selected from the group consisting of petroleum distillates, synthetic petroleum oils, greases, gels, oil-soluble polymer composition, and vegetable oils. Suitable examples include, but not limited to, a mixture of two polyalphaolefins, a mixture of two polyol esters, a mixture of one polyalphaolefine and one polyol ester, a mixture of three polyalphaolefins, a mixture of two polyalphaolefins and one polyol ester, a mixture of one polyalphaolefin and two polyol esters, and a mixture of three polyol esters. In all the embodiments, the base oil preferably has a viscosity of from about 1 to about 1,000 centistokes, more preferably from about 2 to about 800 centistokes, and most preferably from about 5 to about 500 centistokes.

In yet another embodiment, the base oil is grease which is made by combining a petroleum or synthetic lubricating fluid with a thickening agent. The thickeners are generally silica gel and fatty acid soaps of lithium, calcium, strontium, sodium, aluminum, and barium. The grease formulation may also include coated clays, such as bentonite and hectorite clays coated with quaternary ammonium compounds. Sometimes carbon black is added as a thickener to enhance high-temperature properties of petroleum and synthetic lubricant greases. The addition of organic pigments and powders which include aryl urea compounds indanthrene, ureides, and phthalocyanines provide high temperature stability. Sometimes, solid powders such as graphite, molybdenum disulfide, asbestos, talc, and zinc oxide are also added to provide boundary lubrication. Formulating the foregoing grease compositions with thickeners provides specialty greases. The synthetic lubricant oils include, without limitation, diesters, polyalphaolefins, polyol esters, polyglycols, silicone-diester, and silicone lubricants. Non-melting thickeners are especially preferred such as copper phthalocyanine, arylureas, indanthrene, and organic surfactant coated clays.

Nanomaterials

The conductive grease compositions comprise a nanomaterial. Preferred nanomaterials are those functionalized having one or more of a first functional group capable of forming an electrostatic attraction, including, but not limited to, a hydrogen bond or boron nanomaterial; and wherein the fluid comprises one or more of a second functional group capable of forming an electrostatic attraction, including, but not limited to, a hydrogen bond with the first function group of the nanomaterial. Preferred nanomaterials include, but are not limited to, carbon particles and boron nanomaterials.

In some embodiments, the first and second functional group is a hydrophilic functional group. In some other embodiments, the first and second function group are independently —OH, —NH, —COOH, —F, —BH, —O—, —N—, or combination thereof. In yet some other embodiments, the first functional group is sulfonate, carboxyl, hydroxyl, amino, amide, urea, carbamate, urethane, or phosphate and the second functional group is —OH, —NH, —COOH, —F, —BH, —O—, —N—, or combination thereof. In some embodiments, the base oil comprises at least one compound that have at least one functional group that can form an electrostatic attraction, including, but not limited to, a hydrogen bond with at least one functional group in a functionalized carbon nanomaterial or boron nanomaterial.

In some embodiments, the nanomaterial is carbon nanomaterial. In some other embodiments, the nanomaterial is carbon nanotube. In some embodiments, the nanomaterial is a single-walled, multiple-walled nanotube, or a mixture thereof. In some other embodiments, the nanomaterial is a OH functionalized carbon nanomaterial. In yet some other embodiments, the nanomaterial is a fluorine functionalized carbon nanomaterial.

In some embodiments, the nanomaterial is a OH functionalized carbon multi-walled nanotube. In some other embodiments, the nanomaterial is a fluorine functionalized carbon multi-walled nanotube. In yet some other embodiments, the nanomaterial is a OH functionalized carbon single-walled nanotube. In some other embodiments, the nanomaterial is a fluorine functionalized carbon single-walled nanotube.

In some embodiments, the nanomaterial is boron nanomaterial. In some other embodiments, the nanomaterial is a single-walled boron nanotube. In yet some other embodiments, the nanomaterial is a multiple-walled boron nanotube.

In some embodiments, the nanomaterial comprises both carbon and boron nanomaterial. In some other embodiments, wherein the nanomaterial comprises both carbon and boron nanotubes. In some other embodiments, the nanomaterial comprises single-walled carbon, multiple-walled carbon, single-walled boron, multiple-walled boron nanotube, or a combination thereof.

In some embodiments, the improved grease composition comprises from about 0.1 wt-% to about 20 wt-% of the nanomaterial, more preferably between about 0.5 wt % and about 10 wt. %, still more preferably from about 0.1 wt-% to about 5-% of the nanomaterial. In some other embodiments, wherein the composition comprises from about 0.5 wt-% to about 3 wt-% of the nanomaterial. In yet some other embodiments, the composition comprises from about 0.5 wt-% to about 2 wt-% of the nanomaterial. In some other embodiments, the composition comprises from about 0.5 wt-% to about 1.5 wt-% of the nanomaterial. An advantage of the conductive greases described herein is that greases can be prepared with less carbon loading than previously done while maintaining or improving the thermal and/or electrical properties. This provides a cost reduction in addition to conductivity improvement.

Carbon Particles and Boron Nanomaterials

The conductive grease compositions and methods of making the same comprise carbon particles and/or boron nanomaterials. The carbon particles are preferably nanoparticles or nanomaterials. As used herein the reference to nanoparticles or nanomaterials (carbon or boron) includes particles or materials having at least one dimension that is less than 10,000 nanometers. Preferably, the nanoparticles and/or nanomaterials have at least one dimension that is less than 5000 nanometers, more preferably 1000 nanometers, still more preferably less than 750 nanometers, even more preferably less than 500 nanometers, and most preferably less than 250 nanometers. The terms "nanoparticle" and "nanomaterial" include, for example "nanospheres," "nanorods," "nanocups," "nanowires," "nanoclusters," "nanofibers," "nanolayers," "nanotubes," "nanocrystals," "nanobeads," "nanobelts," and "nanodisks."

The terms "carbon nanoparticle" and "carbon nanomaterial" refer to a nanoparticle or nanomaterial which contain primarily carbon element, including, but not limited to, diamond, graphite, fullerenes, carbon nanotubes, carbon fibers, and combinations thereof. Similarly, the terms "boron nanoparticle" and "boron nanomaterial" refers to a nanoparticle or nanomaterial which primarily contain boron element or boron compounds.

The term "nanotube" refers to a class of nanoparticle or nanomaterial which have a shape of a long thin cylinder and contain primarily carbon element. The term "aspect ratio" refers to a ratio of the length over the diameter of a particle. The term "SWNT" refers to a single-walled nanotube. The term "MWNT" refers to a multi-walled nanotube. The term "D-WNT" refers to a double-walled nanotube. The term "F-SWNT" refers to a fluorinated SWNT.

Similarly, the term "carbon nanotube" refers to a class of carbon nanoparticle which have a shape of a long thin cylinder and contain primarily carbon element. The term "boron nanotube" refers to a class of boron nanoparticle which have a shape of a long thin cylinder and contain primarily carbon element. Both carbon and boron nanotube can be multi-wall or single walled nanotube.

Carbon nanotubes ("CNT") are nanoparticles in the shape of a long thin cylinder often with a diameter in few nanometers. The basic structural element in a carbon nanotube is a hexagon which is the same as that found in graphite. Based on the orientation of the tube axis with respect to the hexagonal lattice, a carbon nanotube can have three different configurations: armchair, zigzag, and chiral (also known as spiral). In armchair configuration, the tube axis is perpendicular to two of six carbon-carbon bonds of the hexagonal lattice. In zigzag configuration, the tube axis is parallel to two of six carbon-carbon bonds of the hexagonal lattice. Both these two configurations are achiral. In chiral configuration, the tube axis forms an angle other than 90 or 180 degrees with any of six carbon-carbon bonds of the hexagonal lattice.

Carbon nanotubes of these configurations often exhibit different physical and chemical properties. For example, an armchair nanotube is always metallic whereas a zigzag nanotube can be metallic or semi-conductive depending on the diameter of the nanotube. All three different nanotubes are expected to be very good thermal conductors along the tube axis, exhibiting a property known as "ballistic conduction," but good insulators laterally to the tube axis.

In addition to the common hexagonal structure, the cylinder of a carbon nanotube molecule can also contain other size rings, such as pentagon and heptagon. Replacement of some regular hexagons with pentagons and/or heptagons can cause cylinders to bend, twist, or change diameter, and thus lead to some interesting structures such as "Y-," "T-," and "X-junctions," and different chemical activities. Those various structural variations and configurations can be found in both SWNT and MWNT. However, the present invention is not limited by any particular configuration and structural variation. The carbon nanotube used in the present invention can be in the configuration of armchair, zigzag, chiral, or combinations thereof. The carbon nanotube can also contain structural elements other than hexagon, such as pentagon, heptagon, octagon, or combinations thereof.

Another structural variation for MWNT molecules is the arrangement of the multiple tubes. A perfect MWNT is like a stack of graphene sheets rolled up into concentric cylinders with each wall parallel to the central axis. However, the tubes can also be arranged so that an angle between the graphite basal planes and the tube axis is formed. Such MWNT is known as a stacked cone, Chevron, bamboo, ice cream cone, or piled cone structures. A stacked cone MWNT can reach a diameter of about 100 nm. In spite of these structural variations, all MWNTs are suitable for the present invention as long as they have an excellent thermal conductivity. The term MWNT used herein also includes double-walled nanotubes ("DWNT").

In some embodiments, the carbon nanotubes are single-walled nanotubes ("SWNT"), double-walled nanotubes ("DWNT"), multi-walled nanotubes ("MWNT"), or a combination of the same. In some other embodiment, the carbon nanotubes include carbon SWNT, MWNT, and/or DWNT. As used herein, the term MWNT is inclusive of DWNTs.

In some embodiments, the boron nanotubes are single-walled nanotubes ("SWNT"), double-walled nanotubes ("DWNT"), multi-walled nanotubes ("MWNT"), or a combination of the same. In some other embodiment, the boron nanotubes include boron SWNT, MWNT, and/or DWNT.

Carbon or boron nanotubes used in the present invention can also encapsulate other elements and/or molecules within their enclosed tubular structures. Such elements include Si, Ti, V, Cr, Mn, Fe, Co, Ni, Cu, Y, Zr, Mo, Ta, Au, Th, La, Ce, Pr, Nb, Gd, Tb, Dy, Ho, Er, Tm, Yb, Lu, Mo, Pd, Sn, and W. Carbon nanotubes used in the present disclosure also include alloys of these elements such as alloys of cobalt with S, Br, Pb, Pt, Y, Cu, B, and Mg, and compounds such as the carbides (i.e. TiC, MoC, etc.) The present of these elements, alloys and compounds within the core structure of fullerenes and nanotubes can enhance the thermal conductivity of these nanotubes which then translates to a higher thermal conductive nanofluid when these nanotubes are suspend in a heat transfer fluid.

Carbon nanotubes used in the present invention can also be chemically modified and functionalized to be so-called "functionalized carbon nanotubes", such as covalently attached hydrophilic groups to increase their solubility in hydrophilic fluids or lipophilic chains to increase their solubility in hydrophobic oils. Covalent functionalization of carbon nanotubes, especially fullerenes, has commonly been accomplished by three different approaches, namely, thermally activated chemistry, electrochemical modification, and photochemical functionalization. The most common methods of thermally activated chemical functionalization are addition reactions on the sidewalls. For example, the extensive treatment of a nanotube with concentrated nitric and sulfuric acids leads to the oxidative opening of the tube caps as well as the formation of holes in the sidewalls and thus produces a nanotube decorated with carboxyl groups, which can be further modified through the creation of amide and ester bonds to generate a vast variety of functional groups.

The carbon nanotube can also be modified through addition reactions with various chemical reagents such halogens and ozone. Unlike thermally controlled modification, electrochemical modification of carbon nanotubes can be carried out in more selective and controlled manner. Interestingly, a SWNT can be selectively modified or functionalized either on the cylinder sidewall or the optional end caps. These two distinct structural moieties often display different chemical and physical characteristics. The functional group on functionalized carbon nanotubes may be attached directly to the carbon atoms of a carbon nanotubes or via chemical linkers, such as alkylene or arylene groups. To increase hydrophilicity, carbon nanotubes can be functionalized with one or more hydrophilic functional groups, such as, sulfonate, carboxyl, hydroxyl, amino, amide, urea, carbamate, urethane, and phosphate. To increase hydrophobicity, carbon nanoparticles may be functionalized with one or more hydrophobic alkyl or aryl groups. The functionalized carbon nanoparticle may have no less than about 2, no less than about 5, no less than about 10, no less than about 20, or no less than about 50 functional groups on average.

The term "carbon nanotube" or "boron nanotube" used herein refers to all structural variations and modification of SWNT and MWNT discussed hereinabove, including configurations, structural defects and variations, tube arrangements, chemical modification and functionalization, and encapsulation.

To some extent, any carbon nanomaterial can be chemically modified or functionalized to become a "functionalized carbon nanomaterial", in a similar way for carbon nanotubes.

Carbon nanotubes are commercially available from a variety of sources. Single walled carbon nanotubes can be obtained from Carbolex (Broomall, Pa.), MER Corporation (Tucson, Ariz.), and Carbon Nanotechnologies Incorporation ("CNI", Houston, Tex.). Multi-walled carbon nanotubes can be obtained from MER Corporation (Tucson, Ariz.) and Helix material solution (Richardson, Tex.). However, the present invention is not limited by the source of carbon nanotubes. In addition, many publications are available with sufficient information to allow one to manufacture nanotubes with desired structures and properties. The most common techniques are arc discharge, laser ablation, chemical vapor deposition, and flame synthesis. In general, the chemical vapor deposition has shown the most promise in being able to produce larger quantities of nanotubes at lower cost. This is usually done by reacting a carbon containing gas, such as acetylene, ethylene, ethanol, etc., with a metal catalyst particle, such as cobalt, nickel, or ion, at temperatures above 600° C.

The selection of a particular carbon nanomaterial depends on a number of factors. The most important one is that the carbon nanomaterial is a functionalized carbon nanomaterial having one or more functional groups that are capable of forming hydrogen bond with another functional group existing in an already existing base oil or just co-existing base oil. Boron nanomaterial can generally form hydrogen bond with another functional group capable of forming hydrogen bond.

Another important consideration is that the nanomaterial has to be compatible with an already existing base oil discussed thereafter. Other factors include heat transfer properties, electrical transfer properties, cost effectiveness, solubility, dispersion and settling characteristics. In some embodiments of the present disclosure, the carbon nanomaterial selected contain predominantly single-walled functionalized carbon nanotubes. In some other embodiments, the nanomaterial selected contain predominantly multi-walled functionalized carbon nanotubes. In some embodiments of the present disclosure, the carbon nanomaterial selected contain predominantly single-walled boron nanotubes. In some other embodiments, the nanomaterial selected contain predominantly multi-walled boron nanotubes.

In one aspect, the carbon nanotube has a carbon content of no less than about 60%, no less than about 80%, no less than about 90%, no less than about 95%, no less than about 98%, or no less than about 99%.

In another aspect, the carbon or boron nanotube has a diameter of from about 0.2 to about 100 nm, from about 0.4 to about 80 nm, from about 0.5 to about 60 nm, or from about 0.5 to about 50 nm. In yet another aspect, the carbon nanotube is no greater than about 200 micrometers, no greater than 100 micrometers, no greater than about 50 micrometers, or no greater than 20 micrometers in length. In yet another aspect, the carbon nanotube has an aspect ratio of not greater than about 1,000,000, no greater than 100,000, no greater than 10,000, no greater than 1,000, no greater than about 500, no greater than about 200, or no greater than about 100.

Grease Additives

In some embodiments, the conductive grease compositions further comprise a grease additive. In some other embodiments, the composition further comprises $MoS_2$ as an additive. In some other embodiments, the conductive grease composition is free of other grease additive.

Surfactants

The conductive grease compositions can include a surfactant or be free of surfactant. Surfactants suitable for use with the compositions of the present invention include, but are not limited to, nonionic surfactants, anionic surfactants, and zwitterionic surfactants. In some embodiments, the compositions of the present invention include about 10 wt % to about 50 wt % of a surfactant. In other embodiments the compositions of the present invention include about 15 wt % to about 30% of a surfactant. In still yet other embodiments, the compositions of the present invention include about 25 wt % of a surfactant. In some embodiments, the compositions of the present invention include about 100 ppm to about 1000 ppm of a surfactant.

Viscosity Modifiers

The conductive grease compositions can optionally comprise a viscosity modifier. Preferred viscosity modifiers include thickeners.

Methods of Preparing the Conductive Grease Compositions

The conductive grease compositions can be prepared with a variety of equipment and under conditions specific to the ingredients for the particular conductive grease composition. For example, the method may include heating the fluid, such that carbon particles and/or boron nanomaterials can be dispersed therein. The precise temperature of the heating may be dictated by the melting point or boiling point of the fluid.

The conductive grease compositions can be prepared in batch or continuous processes. To prepare the conductive grease compositions, the fluid may be heated. Preferably, the fluid is heated. The temperature of heating may vary based on the fluid. Preferably it is a temperature between about 60° C. and about 200° C., more preferably a temperature between about 70° C. and about 180° C. In some embodiments, heating is not necessary. For example, in an embodiment where water is the fluid or comprises a significant percentage of the fluid, heating is not required.

After heating the base oil, carbon particles and/or boron nanomaterials can be added to the base oil. The carbon particles and/or boron nanomaterials can be added all at once or sequentially in smaller portions. Preferably, the carbon particles and/or boron nanomaterials are mixed or stirred in the fluid to form a conductive grease composition. If the carbon particles and/or boron nanomaterials are added sequentially in small portions, the mixing and/or stirring can be performed as the nanotubes are being added and/or between sequential additions. Preferred mixing and stirring methods, include, but are not limited to, automatic mixers (such as paddle mixers), stir bars, manual stirring or manual mixing, sonication, etc. The intensity and speed of the mixing or stirring can vary. Preferably, the intensity and/or speed are not too vigorous so as to break or degrade the carbon particle and/or boron nanomaterial structures. The stirring can occur for any amount of time sufficient to disperse the carbon particles and/or boron nanomaterials. Preferably, the carbon particles and/or boron nanomaterials are thoroughly dispersed; most preferably, the carbon particles and/or boron nanomaterials are homogenously dispersed in the fluid. Preferred mixing and/or stirring times can be between about 1 minute and 2 hours; more preferably, between about 2 minutes and about 1 hour; most preferably between 5 minutes and 30 minutes. In an embodiment where the preparation of the conductive grease compositions is a continuous process, the mixing may be continuous.

After mixing, the conductive grease composition can optionally be heated, cooled, or maintained at the same temperature. If the conductive grease composition is heated, it is preferably heated to a temperature between about 80° C. and about 240° C., more preferably to a temperature between about 100° C. and about 220° C. The heating can be performed for a time between about 1 minute and about 2 hours; more preferably between about 5 minutes and about 90 minutes; most preferably between about 10 minutes and about 1 hour.

Preferably the conductive grease is passed through a roller mill, an extruder, a manual or mechanical stirrer. Preferably, the conductive grease is passed through a roller mill. Preferred roller mills, include, but are not limited to, two-roll mills and three-roll mills. Preferably the conductive grease composition is passed through a roller mill a sufficient number of times to obtain a smooth consistency. In a preferred method, the conductive grease is passed through a roller mill between 1 and 20 times, more preferably between 2 and 15 times, most preferably between 3 and 10 times. The conductive grease can be passed through the same roller mill multiple times or through a series of roller mills to achieve the desired number of pass-throughs.

After passing the conductive grease through a roller mill, the conductive grease can be heated, cooled, or maintained at the same temperature.

While an understanding of the mechanism is not necessary to practice the present invention and while the present invention is not limited to any particular mechanism of action, it is contemplated that the combination of a fluid and nanomaterial that can form an electrostatic attraction, including, but not limited to, a hydrogen bond among them leads to enhanced thermal and electrical conductivity. Because of this combination, the disclosed grease compositions herein possess an enhanced thermal and/or electrical conductivity. The disclosed grease compositions are also more stable even under tough conditions.

All publications and patent applications in this specification are indicative of the level of ordinary skill in the art to which this invention pertains. All publications and patent applications are herein incorporated by reference to the same extent as if each individual publication or patent application was specifically and individually indicated as incorporated by reference.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

Example 1

In this Example, a series of greases by three roll mills and their resistances were measured, respectively.

Figure 2:
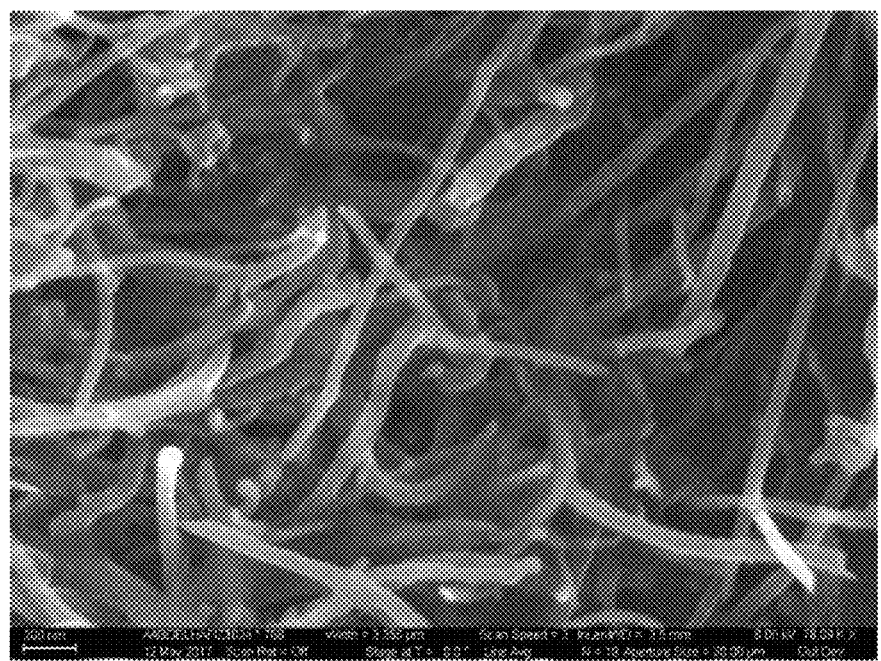
FIG. 2 shows a scanning electron microscope (SEM) image of the grease based on 7.5 wt % MWNT-OH/92.5 wt % Ester oil.

An exemplary procedure to make a grease is following. First, heat 92.5 g N650HT Oil to 120° C. on a hot plate; slowly add 7.5 g multi wall carbon nanotubes (MWNT-OH Industrial Grade) while stirring at a speed setting of 3 of hot plate. Once all carbon nanotubes have been added, continue to stir for 10 minutes. Then, raise temperature to 150° C. while stirring for 30 minutes at 150° C. Afterwards, allow the product to cool down while stirring until it is safe to handle. Finally, manufacture the grease through the three-roll mill 8-times to obtain a smooth consistency grease. FIG. 1 shows the grease based on 7.5 wt % MWNT-OH/92.5 wt % Ester oil. FIG. 2 shows a SEM image of the grease based on 7.5 wt % MWNT-OH/92.5 wt % Ester oil. This image clearly indicates that nanotubes form a network that is contributing the conductivity.

Table 1 lists the ingredients and the measured resistances. The resistance was measured with a Keithly instrument 2401.

TABLE 1

The ingredients and measured resistance of some exemplary greases.

| Base Oil | Carbon Material | Carbon wt. % | Resistance (ohm · cm) |
| --- | --- | --- | --- |
| Petro-Canada NH650HT | MWNT-OH (Industrial) | 7.5 | 22.4 |
| ROYCO 500 | MWNT-OH (Industrial) | 7.5 | 80 |
| PAO Durasyn 166 | MWNT-OH (Industrial) | 7.5 | 4.5k |
| Petro-Canada NH650HT | Nano C SWNT | 2 | 2.3k |
| Petro-Canada NH650HT | CNT-MWCNT | 8.4 | 7.88k |
| Krytox XHT750 | Helix MWNT | 15 | 40 |
| Krytox XHT750 | MWNT-OH (Industrial) | 1.8 | 18.6 |
| Ethylene Glycol | MWNT-OH (Industrial) | 4.46 | 96 |
| Ethylene Glycol | MWNT (Industrial) | 12.53 | 46 |
| Glycerol | MWNT-OH (Industrial) | 4.5 | 28 |
| Glycerol | MWNT (Industrial) | 12.5 | 48.5 |
| 75% Glycerol/25% Water | MWNT-OH (Industrial) | 4.5 | 10 |
| 50% Glycerol/50% Water | MWNT-OH (Industrial) | 4.5 | 20 |
| 50% Glycerol/(25% Water/25% Ethylene Glycol) | MWNT-OH (Industrial) | 4.5 | 16.83 |
| 50% Ethylene Glycol/50% Water | MWNT-OH (Industrial) | 5.68 | 11.9 |
| PAO Durasyn 166 | Helix MWNT | 20 | 2.7k |
| Petro-Canada NH650HT | Pyrograf Pr-19-XT-HHT | 10 | 16.1k |
| PAO Durasyn 166 | Pyrograf Pr-19-XT-HHT | 12 | 227 |
| Glycerol | Pyrograf Pr-19-XT-HHT | 12 | 175 |
| PAO Durasyn 166 | Pyrograf Pr-19-XT-HHT CNF and MWNT-OH (Industrial) | 4.48 each | 138 |
| 50% Glycerol/50% Water | MWNT-OH (Industrial) | 4.5 (10% NaCl Added) | 130 |
| Glycerol | MWNT-OH (Industrial) | 4.5 (3% Cu Nano-particles added) | 178 |
| Commercial grease Nyogel 758G | unknown | unknown | 300-500 |

All greases made were found to be stable. No oil leaks were found for these grease samples for at least 10 days after they were applied to a test device. The stability of the grease compositions was assessed visually. If unstable the oil will separate and collect on top of the grease. This was not observed for any of the exemplary samples prepared and examined.

As shown in Table 1, some greases are better than the common commercial grease in terms of electrical resistances. Some samples show 4-5 times conductivity enhancement. Closer study of the measured resistance values leads to an unexpected observation, that is, that the combination of a carbon nanotubes and base oil that have functional groups for forming the hydrogen boding between them leads to a high conductivity grease. In other words, hydrogen bonding between a carbon nanotube and base oil is the reason to have extra high conductivity.

For examples, the highest conductivity sample is 75% Glycerol/25% Water with MWNT-OH (4.5 wt %), in which water or glycerol can form hydrogen bonds with MWNT-OH, OH functionalized multiple wall nanotubes. On the other hand, the lowest conductivity grease is Petro-Canada NH650HT with MWNT (8.4 wt %) and fiber (10 wt %), in which no hydrogen bond is possible between the MWNT and base oil. Predictably, oil that has strong hydrogen bonding capability (krytox XHT750) leads to a very low nanotube loading (<2 wt %) and yet high conductivity.

Example 2

In this Example, friction coefficients of some exemplary greases were measured. FIG. 3A-FIG. 3D show the friction coefficients exhibited by CNT-based greases and three other conventional lubricant greases, Li-based grease (labeled Grease D), Ca-based grease (labeled Grease A), and Li-based grease with $MoS_2$ as additive (labeled Grease E), in steady-state and fretting/oscillating motion condition as well.

Figure 3A:
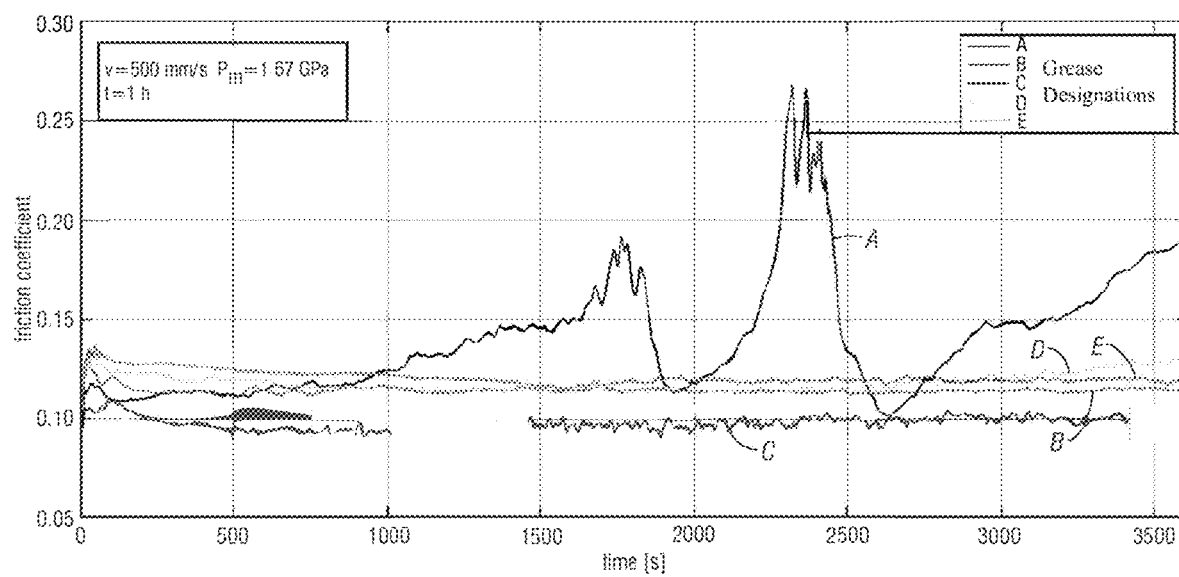
FIG. 3A shows the friction coefficients exhibited by CNT-based greases and three other conventional lubricant greases.
Figure 3B:
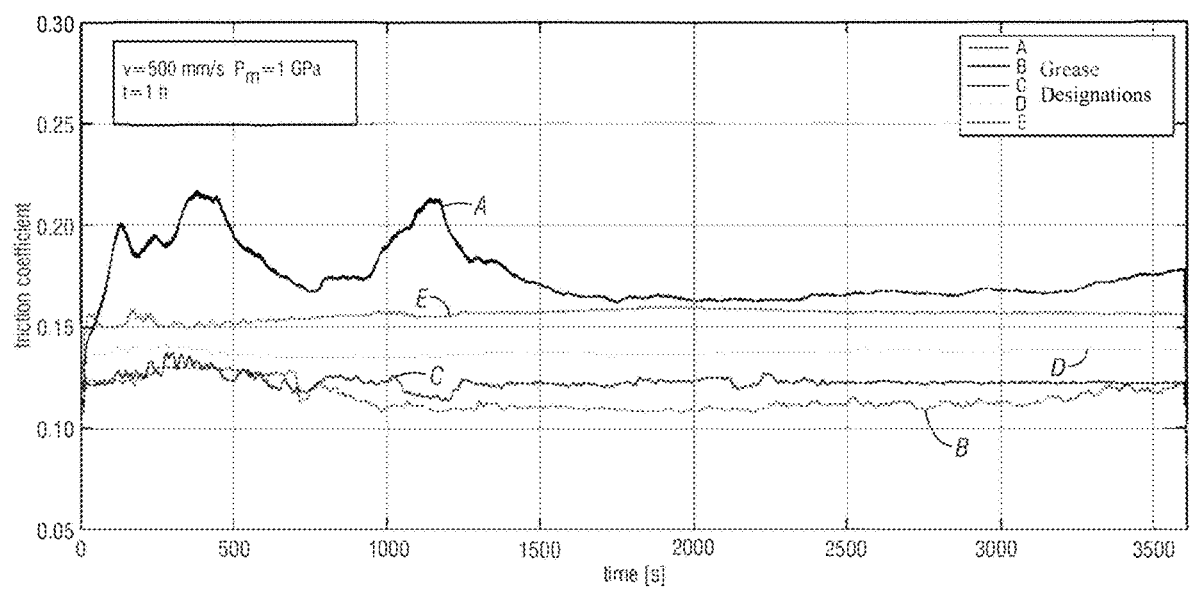
FIG. 3B shows the friction coefficients exhibited by CNT-based greases and three other conventional lubricant greases.
Figure 3C:
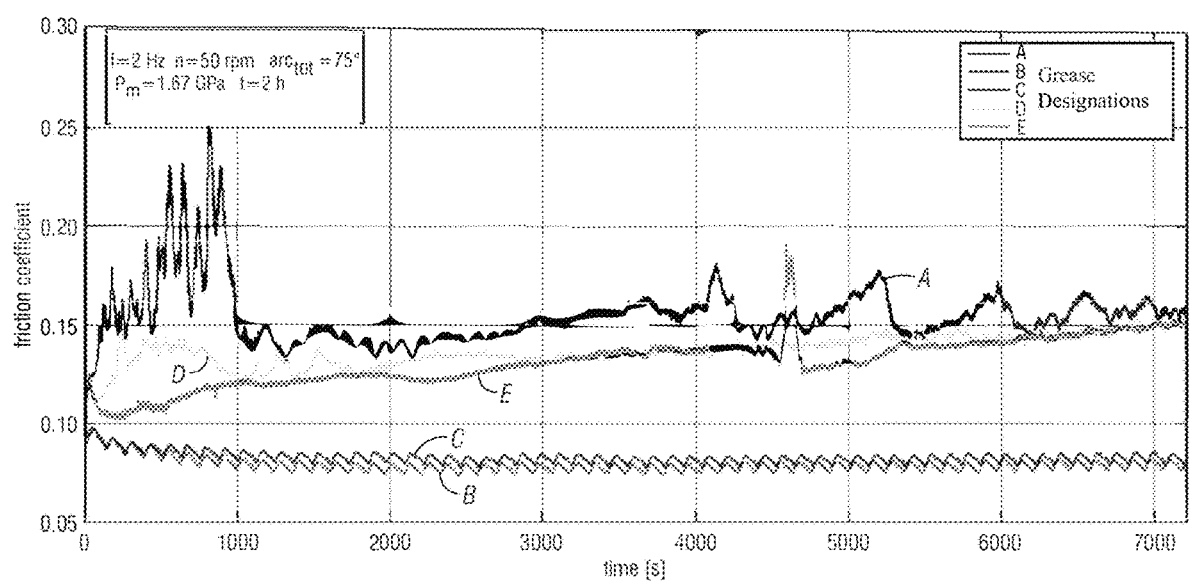
FIG. 3C shows the friction coefficients exhibited by CNT-based greases and three other conventional lubricant greases.
Figure 3D:
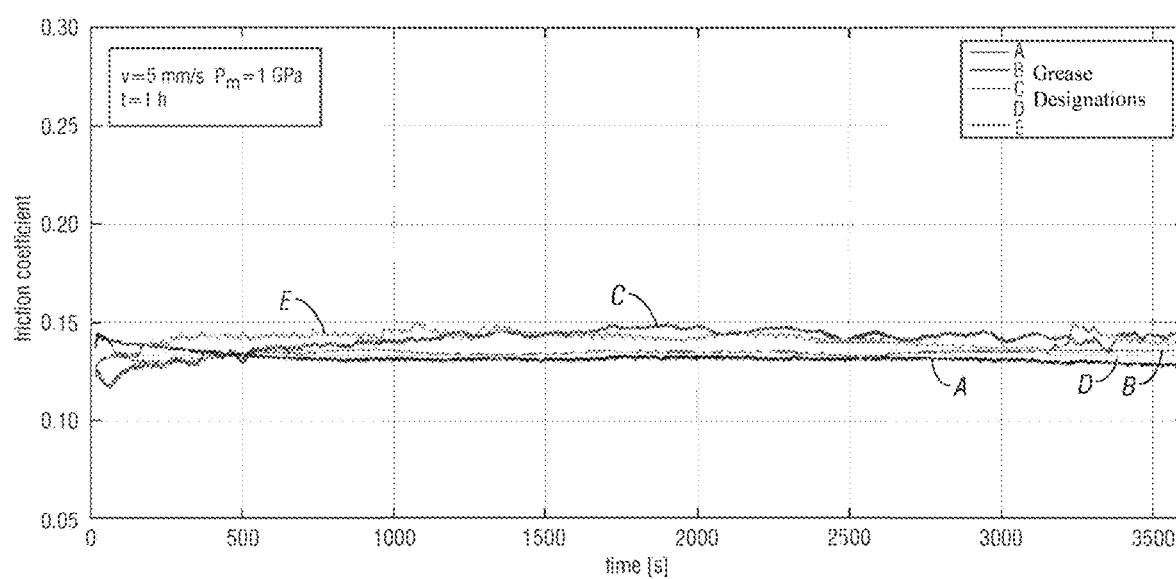
FIG. 3D shows the friction coefficients exhibited by CNT-based greases and three other conventional lubricant greases.

As shown in FIG. 3A-3D, in nearly all test conditions, CNT (labeled Grease B) or CNT+$MoS_2$ (labeled Grease C) based greases provided the lowest friction coefficients. The testing in FIG. 3C is representative of difficult conditions consistent with tough industrial operations thermal greases may be exposed to), CNT-based greases (Greases B and C) achieved friction reduction by more than 50%. These results are also unexpected.

In summary, comparing to the current commercial electrical conductive grease which are made by mixing commercial Li grease and carbon particles, the grease disclosed herein show unexpected better conductivity, long stability, reduced friction coefficient.

The unexpected results in this disclosure also lead to an improved way to significantly enhance the electrical conductivity of greases while reduce the nanotube loading percentage. The new discovery here is that hydrogen bonding between nanotube and oil is the key element for a good conductivity performance. This discovery is totally different with the prior art, in which non-functional nanotubes in high percentages were used for greases with higher thermal conductive, instead of electrical conductivity.

The sole thickener of carbon nanotubes in our grease structure makes our grease unique and valuable. Compared to commercial grease that carbon is added without bonding and conductivity decreased with the time, the conductivity of our grease shall keep stable.

Example 3

In this Example, the ability of the greases disclosed herein to increase thermal conductivity of some common high thermal conductivity greases. High thermal conductive grease was usually made by nanomaterial, such as carbon and boron nanomaterial, and base oils. It was discovered unexpectedly that adding both water, oil/nanomaterials that have functional groups for forming the hydrogen bonds between them can increase greases' thermal conductivity as well. In other words, hydrogen bonding is the key to have extra high thermal conductivity in a grease, similar to have extra electrical conductivity. It was also found out that boron nanotube function similarly to increase thermal conductivity as carbon nanotubes. Boron nanomaterial can form the hydrogen bonding as well.

The most unexpected results are that a few percentage of the greases disclosed herein or nanomaterial that can form hydrogen bond with another functional group existing in a commercial grease, the thermal conductivity of the commercial grease enhance significantly. Table 2 shows the results of adding various hydrogen bond forming water, or nanomaterials into a base oil or greases. For example, 1 wt % loading could lead to 50 percent TC enhancement and 2-3 wt % loading lead to more than 100% TC enhancement.

TABLE 2

Thermal Conductivities Enhancement of adding carbon or boron nanomaterial to grease compositions.

| Base Fluid | 2nd Base Fluid | 1st particles | 2nd particles | TC (W/mK) | TC Percent Increase |
|---|---|---|---|---|---|
| 17.2 g Glycerol | N/A | BN nano 2.8 g (14%) | N/A | 0.4584 | 47% |
| 17.2 g PAO | N/A | BN nano 2.8 g (14%) | N/A | 0.2320 | 36.6% |
| 14.3 g Fromblin #4000 | N/A | BN nano 1.3796 (8.78%) | N/A | 0.1562 | 44.50% |
| Glycerol 8.6 g (43%) | Water 8.6 g (43%) | BN-nano 2.8 g (14%) | N/A | 0.6528 | 45.8% |
| 17.2 g Glycerol | N/A | BN-nano 1.4 g (7%) | CNF-19 1.4 g (7%) | 1.4453 | 366% |
| 17.2 g Glycerol | N/A | CNF-19 0.7 g 25% (3.5%) | BN nano 2.1 g 75% (10.5%) | 0.8975 | 188% |
| 14 g Krytox XHT 750 | N/A | BN nano 1.0 g (9.1%) | N/A | 0.1487 | 31.5% |
| Glycerol 8.6 g (43%) | Water 8.6 g (43%) | BN-nano 1.4 g (7%) | CNF-19 1.4 g (7%) | 1.7885 | 299.5% |

TABLE 2-continued

Thermal Conductivities Enhancement of adding carbon or boron nanomaterial to grease compositions.

| Base Fluid | 2nd Base Fluid | 1st particles | 2nd particles | TC (W/mK) | TC Percent Increase |
|---|---|---|---|---|---|
| 17.2 g Used Silicon oil from water bath heater | N/A | BN nano 2.8 g (14%) | N/A | 0.2618 | 44% |
| 23.87 g Used Silicon oil from water bath heater | N/A | CNF-19 1.24 g (4.9%) | N/A | 0.5097 | 180.5% |
| Used Silicon oil from water bath heater | N/A | Silica nano 1.23 g (5.1%) | N/A | 0.1968 | 8% |
| Used 18.6 g Silicon oil from water bath heater | N/A | MWNT-OH 1.4 g (7%) | N/A | 0.3390 | 86.6% |
| NYE 758G grease | N/A | CNF-19 (5%) | N/A | 0.4781 | 163.3 |
| 10 g Valvoline Cerulean Grease | N/A | CNF-19 0.38 g (3.66%) | N/A | 0.3479 | 108.7% |
| 5 g Glycerol (25%) | 15 g H2O (75%) | CNF-19 1.4 g (6.54%) | N/A | 1.9487 | 261.5% |
| Old Grease Sample 9-1 (PAO with SWNT or MWNT) | N/A | CNF-19 (5%) | N/A | 0.5027 | 98.9% |
| 5.0453 g (Apr. 6, 2017 6% CNF-19 94% NYE 758G blank grease) | 1.0513 g NYE 758G grease | final is 4.97% CNF-19 | N/A | 0.48662 | N/A |
| 10 g Valvoline Cerulean Grease | N/A | CNF-19 0.19 g (1.83%) | Graphene nano platelets 0.19 g (1.83%) | 0.2136 | 28% |
| 10 g Valvoline Cerulean Grease | N/A | CNF-19 0.19 g (1.83%) | BN nano 0.19 g (1.83%) | 0.2295 | 37.7% |
| 5 g (Feb. 15, 2017 7.5% MWNT-OH 92.5% PAO 166) | N/A | CNF-19 0.265 g (5%) | N/A | 0.6704 | 109.6% |
| 5 g (MG Chemicals Silicone Heat Transfer Compound) | N/A | CNF-19 0.265 g (5%) | N/A | 1.6995 | 143.4% |
| 5 g (MG Chemicals Silicone Heat Transfer Compound) | N/A | CNF-19 0.155 g (3%) | N/A | 1.333 | 91% |
| 5 g (MG Chemicals Silicone Heat Transfer Compound) | N/A | CNF-19 0.051 g (1%) | N/A | 0.9871 | 41.4% |

The thermal conductivity data was obtained using the Hot Disk™ thermal constants analyzer, using the following parameters:
measurement depth: 6 mm
room temperature: 25° C.
power: 0.025 W
measurement time: 16 seconds
sensor radius: 2.001 mm
TCR: 0.0471/K,
disk type: Kapton
temperature drift rec: yes As can be seen in Table 2, the grease compositions prepared according to the methods of the invention, having carbon particles or boron nanomaterials, had improved thermal conductivity values often of at least 40% and even over 100%. Further, the Table demonstrates that conductive greases prepared with boron nanomaterials also provide improved thermal properties.

The inventions being thus described, it will be obvious that the same may be varied in many ways. Such variations are not to be regarded as a departure from the spirit and scope of the inventions and all such modifications are intended to be included within the scope of the following claims. The above specification provides a description of the manufacture the disclosed compositions and methods. Since many embodiments can be made without departing from the spirit and scope of the invention, the invention resides in the claims.

What is claimed is:

1. A stable conductive grease composition comprising:
from about 25 wt-% to about 99 wt-% of a fluid;
from about 0.1 wt-% to about 5 wt-% of a nanomaterial;
wherein the nanomaterial is a carbon nanomaterial having one or more of a first functional group capable of forming a hydrogen bond or a boron nanomaterial;
wherein the fluid comprises one or more of a second functional group capable of forming a hydrogen bond, wherein the second functional group is an —OH, —NH, —COOH, —F, —BH, —O—, —N—, or combination thereof;
wherein the stable conductive grease composition is free of surfactant; and
wherein the stable conductive grease has a resistance which is improved over the fluid alone by at least about 20%.

2. The composition of claim 1, wherein the first functional group is a hydrophilic functional group.

3. The composition of claim 2, wherein the first functional group is an —OH, —NH, —COOH, —F, —BH, —O—, —N—, or combination thereof.

4. The composition of claim 2, wherein the nanomaterial is the carbon nanomaterial.

5. The composition of claim 4, wherein the carbon nanomaterial is carbon nanotube, carbon nanofiber, graphite particle, graphene particle, or combination thereof having at least one dimension that is less than 10,000 nanometers.

6. The composition of claim 1, wherein the nanomaterial is an OH functionalized carbon nanomaterial, a fluorine functionalized carbon nanomaterial, or a combination thereof.

7. The composition of claim 1, wherein the nanomaterial is the boron nanomaterial.

8. The composition of claim 7, wherein the nanomaterial comprises single-walled boron nanotube, multiple-walled boron nanotube, or a combination thereof.

9. The composition of claim 1, wherein the fluid comprises a base oil, and wherein the base oil is an API Group I oil, API Group II oil, API Group III oil, API Group IV oil, API Group V oil, or a mixture thereof.

10. The composition of claim 9, wherein the base oil comprises an alkyl alcohol, alkylene glycols, polyol ester, or a combination thereof.

11. The composition of claim 1, wherein the nanomaterial and the fluid are hydrogen bonded.

12. The stable conductive grease composition of claim 1, wherein the composition further comprises a grease additive.

13. A method of preparing the stable conductive grease composition of claim 1 comprising:
 (a) combining the fluid and the nanomaterial;
 (b) mixing the fluid and the nanomaterial to form a grease composition; and
 (c) passing the grease composition through a roller mill, an extruder, a manual stirrer, and/or a mechanical stirrer to form the stable conductive grease composition.

14. The method of claim 13, wherein the fluid is heated prior to, during, and/or after step (a).

15. The method of claim 13, wherein the fluid is not heated before or during mixing.

16. The method of claim 13, wherein the grease composition is heated during and/or after step (b).

* * * * *

UNITED STATES PATENT AND TRADEMARK OFFICE
CERTIFICATE OF CORRECTION

| | |
|---|---|
| PATENT NO. | : 11,053,124 B2 |
| APPLICATION NO. | : 16/381798 |
| DATED | : July 6, 2021 |
| INVENTOR(S) | : Haiping Hong, Christian A. Widener and Gregory Lee Christensen |

It is certified that error appears in the above-identified patent and that said Letters Patent is hereby corrected as shown below:

On the Title Page

At Item (72) Inventors, at Line 5:
INSERT: --Hammad A. Younes, Rapid City, SD (US)--

Signed and Sealed this
Twentieth Day of June, 2023

Katherine Kelly Vidal
*Director of the United States Patent and Trademark Office*